(12) United States Patent
Bose et al.

(10) Patent No.: US 12,488,631 B2
(45) Date of Patent: Dec. 2, 2025

(54) SYSTEM AND METHOD FOR BATTERY SELECTION

(71) Applicant: CPS Technology Holdings LLC, New York, NY (US)

(72) Inventors: Deepan C. Bose, Brookfield, WI (US); Austin Bellile, Milwaukee, WI (US); Jason D. Searl, Bayside, WI (US); Kathryn M. Ciurlik, Racine, WI (US); Zhihong Jin, Pewaukee, WI (US); Diego Hernan Diaz Martinez, Milwaukee, WI (US); Logan Crain, Milwaukee, WI (US)

(73) Assignee: CPS Technology Holdings LLC, New York, NY (US)

( * ) Notice: Subject to any disclaimer, the term of this patent is extended or adjusted under 35 U.S.C. 154(b) by 226 days.

(21) Appl. No.: 18/033,606

(22) PCT Filed: Oct. 29, 2021

(86) PCT No.: PCT/US2021/057238
§ 371 (c)(1),
(2) Date: Apr. 25, 2023

(87) PCT Pub. No.: WO2022/094204
PCT Pub. Date: May 5, 2022

(65) Prior Publication Data
US 2023/0401901 A1    Dec. 14, 2023

Related U.S. Application Data

(60) Provisional application No. 63/107,835, filed on Oct. 30, 2020.

(51) Int. Cl.
*G07C 5/00* (2006.01)
*B60R 16/033* (2006.01)
*B60S 5/06* (2019.01)

(52) U.S. Cl.
CPC ............ *G07C 5/008* (2013.01); *B60R 16/033* (2013.01); *B60S 5/06* (2013.01)

(58) Field of Classification Search
CPC ......... G07C 5/008; B60R 16/033; B60S 5/06; Y02T 10/70; Y02T 10/7072; Y02T 10/72;
(Continued)

(56) References Cited

U.S. PATENT DOCUMENTS

2005/0080641 A1    4/2005  Ronning et al.
2015/0310524 A1*  10/2015  Gospodarek ....... G06Q 30/0643
                                                      705/26.61
(Continued)

FOREIGN PATENT DOCUMENTS

CA        3 095 767 A1    10/2019
DE  10 2012 212547 A1     5/2014
(Continued)

OTHER PUBLICATIONS

International Search Report and Written Opinion, PCT/US2021/057238, 15 pages, mailed Feb. 1, 2022.

*Primary Examiner* — Alan D Hutchinson
(74) *Attorney, Agent, or Firm* — Boardman & Clark LLP

(57) ABSTRACT

A system and method for selecting a battery (e.g., a battery selector) is disclosed. The example battery selector includes a plurality of battery factors, a plurality of electrical load factors, a plurality of cycling or crank data, and an output. The output includes a battery selection based on the plurality of battery factors, plurality of vehicle loads, and the plurality of cycling or crank data.

20 Claims, 17 Drawing Sheets

(58) Field of Classification Search
CPC ...... Y02T 90/16; G06Q 10/04; G06Q 10/063;
G06Q 10/20; G06Q 30/0282; G06Q
50/40; G06Q 30/0631; G06Q 30/0643;
B60L 53/80; B60L 1/00; B60L 2240/54;
B60L 2240/70; B60L 2250/12; B60L
2250/18; B60L 2250/16; G01R 31/386;
G01R 31/396
See application file for complete search history.

(56) References Cited

U.S. PATENT DOCUMENTS

2018/0354379 A1* 12/2018 Wu ................... H02J 7/0047
2021/0239764 A1* 8/2021 Jin ................... G01R 31/392

FOREIGN PATENT DOCUMENTS

WO       2019204701 A1    10/2019
WO       2022/094204 A1    5/2022

* cited by examiner

| States 237 | High Electrical Demand 203 | User Behavior 202 | Environment I Operate Within 200 |
|---|---|---|---|
| 1 | | | |
| 2 | | | ✓ |
| 3 | | ✓ | |
| 4 | ✓ | | |
| 5 | ✓ | ✓ | ✓ |
| 6 | ✓ | | ✓ |
| 7 | ✓ | ✓ | ✓ |

| | High Electrical Demand 203 | Driving Pattern | Temperature (Ambient and Under Hood) |
|---|---|---|---|
| Influencing Factors 233 | OE on Board | Plug Ins | Road Condition |
| | AM Enhancement | Urban/Suburban/Rural | Battery Placement |
| | Load Mgmt. Strategy | | |
| Application 235 | Diesel | Milk Run | PR |
| | Plow Truck | Road Warrior | Desert Environment |
| | Mini Van | Student | South USA |
| | Luxury | Avid Enthusiast | Without Heat Shield |
| | Start/Stop | Traffic EQ | |

FIG. 2

| Device 401 |
|---|
| Auto-Park |
| Autopilot |
| Biometrics |
| Energy Load Mgmt. |
| Navigation & GPS |

| Vehicle Profiles 403 | |
|---|---|
| Vehicle 1 | Vehicle 2 |
| 1 | 0 |
| 0 | 0 |
| 1 | 1 |
| 0 | 1 |
| 0 | 0 |

| Season and Time Profiles 405 | | |
|---|---|---|
| night | day | summer | winter |
| 1 | 1 | 1 | 1 |
| 0 | 1 | 1 | 0 |
| 1 | 0 | 1 | 1 |
| 1 | 1 | 1 | 1 |
| 1 | 1 | 0 | 1 |

411

1. Conventional ICE vehicles
2. ICE vehicle with or without start-stop

1. Dual / auxiliary battery networks
2. Hybrid vehicles
3. Electric vehicles

Find the Right Battery for Me

YEAR:

MAKE:

MODEL:

ENGINE:

SUBMIT

FIG. 14

SYSTEM AND METHOD FOR BATTERY SELECTION

This application is a National Stage Entry of PCT/US2021/057238," filed Oct. 29, 2021, entitled "SYSTEM AND METHOD FOR BATTERY SELECTION", which claims benefit to U.S. Provisional Application No. 63,107,835, filed Oct. 30, 2020, entitled "SYSTEM AND METHOD FOR BATTERY SELECTION", both of which are hereby incorporated by reference for all purposes.

FIELD

This application relates to the field of batteries and more particularly to automotive batteries.

BACKGROUND

The performance requirements of batteries have changed with evolving vehicle technologies. While existing batteries may support cranking and relatively limited internal vehicle electrical function (i.e., radio, air conditioning, lights, etc.), battery requirements have shifted over time.

For example, many recent vehicles are equipped with technology which shuts down the engine when the vehicle is at rest or stopped (for example, at a stoplight). This feature is known as "start-stop technology" and aims to reduce fuel consumption and idle emissions. In hybrid vehicles, the engine also shuts down, which may have the start-stop function fully integrated without the ability to be disabled. Typically, a vehicle will continue to provide internal functions (e.g., air conditioning, heat, radio, etc.) while the engine is turned off during a start-stop event. When the brake starts to be released or the clutch is starting to be engaged, the engine is restarted.

Further, as advanced systems and functionality become increasingly common, the likelihood of depending on the batteries is increased for more advanced and often safety-critical loads. For example, lane-assist and to a greater extent autonomous steering technology may require the vehicle system to provide consistent power to a steering module within the vehicle.

These and other evolving functionalities may create strain on the battery. Different batteries may be more suited to support these functionalities than others. Further, these functionalities and subsequent strain may contribute to changes in anticipated life of a battery within a vehicle. In other words, supporting these functionalities may impact battery life.

Current systems may not adequately predict battery life. Current systems may likewise be inadequate at properly identifying a suitable battery.

SUMMARY

Accordingly, an improved system and method of selecting a battery is disclosed. The system and method may evaluate and provide a recommendation for the best battery for a particular vehicle, used in a particular way, in a particular environment. In other words, the disclosed system and method may provide a battery recommendation based off the intended usage case as well as environmental factors of the vehicle. This recommendation will, in various embodiments, be backed by quantitative data outputted by a model where selection criteria will then be in place to select the proper battery. The system may be used in new vehicles (OEM setting) or in used vehicles (for example, in replacement batteries). In addition, it may be used in a single vehicle or in a group of vehicles—for example Zip Code ViO (Vehicle in Operation) Analysis (for IAM) or "All SUVs" (for an OE). The system may allow for better predictions for warranty purposes and performance characteristics. The system may also allow for comparison of battery performance, for example, among a range of battery technologies, product lines (including for example manufacturers, plants), and group sizes. The system may also be able to provide different usage cases and control strategy (how the OE manages alternator and battery) cases and their effect on the life of a particular battery (e.g., Soccer Mom vs. Traveling Salesman vs. Off-Road Driver). The life of the particular battery may be given, in various embodiments, relative to the life of other batteries.

Various embodiments of a battery longevity predictor are disclosed herein. The battery longevity predictor according to one embodiment analyzes a plurality of battery factors, a plurality of electrical load factors, a plurality of cycling or crank data, and an output. The output may include a battery longevity predictor based on the plurality of battery factors, a plurality of vehicle loads, and/or the plurality of cycling or crank data. In some example embodiments the battery longevity predictor includes a battery simulator using the plurality of battery factors, the plurality of vehicle loads, and/or the plurality of cycling or crank data. In some example embodiments of the battery longevity predictor, the electrical load factors include driver factors. In some example embodiments of the battery longevity predictor, the driver factors include driving patterns and driving context. In some example embodiments of the battery longevity predictor, the electrical load factors include environmental factors. In some example embodiments of the battery longevity predictor, the battery simulator includes a vehicle simulation and performance analysis.

An example vehicle is described herein. In some embodiments, the example vehicle includes a vehicle system having a system having a number of loads defining a load profile, a validated battery comprising one or more batteries which can fulfill the load profile, and an integrated battery selected from the validated battery. In some examples, the integrated battery selected for longevity relative to other batteries. In some example embodiments, the validated battery is provided within the vehicle. In some example embodiments of the vehicle system, the load profile includes battery size. In some example embodiments of the vehicle system, the load profile includes environmental factors. In some example embodiments of the vehicle system, the load profile includes driver factors. In some example embodiments of the vehicle system, the load profile includes vehicle loads. In some example embodiments of the vehicle system, longevity is evaluated relative to a number of factors, which may include Amp-hr throughput over time, average and peak current over time, state of charge over time, depth of discharge over time, and Fuel Economy.

An example battery selector is disclosed. The example battery selector may include a plurality of battery factors, a plurality of electrical load factors, a plurality of cycling or crank data, and an output. In some embodiments of the battery selector, the output includes a battery selection based on the plurality of battery factors, a plurality of vehicle loads, and the plurality of cycling or crank data. In some embodiments of the battery selector, includes a battery simulator having the plurality of battery factors, the plurality of vehicle loads, and/or the plurality of cycling or crank data. In some embodiments of the battery selector, the electrical load factors comprise driver factors. In some embodiments of the battery selector, the driver factors comprise driving patterns and driving context. In some embodiments of the battery selector, the electrical load factors comprise environmental factors. In some embodiments of the battery selector, the battery simulator includes a vehicle simulation and performance analysis. In some embodiments the battery selector includes a display, wherein the display shows the battery selection. In some embodiments of the battery selector, the driver factors comprise user input driver factors.

Further advantages and aspects can be understood from the details provided further herein.

BRIEF DESCRIPTION OF THE FIGURES

FIG. 2 is a tabular diagram of a number of factors impacting battery longevity.

FIGS. 13-18 are partial screen captures of an application being executed on the electronic device of FIG. 10.

It should be understood that the drawings are not necessarily to scale. In certain instances, details that are not necessary to the understanding to the invention or render other details difficult to perceive may have been omitted. It should be understood, of course, that the invention is not necessarily limited to the particular embodiments illustrated herein.

DETAILED DESCRIPTION

Turning to the figures, a system and method is described, which helps to identify battery longevity and/or which battery may be best suited to a particular vehicle, driver, etc. The present disclosure may be understood to relate to, but is not limited to, use of a battery in a vehicle environment. In various embodiments, the battery may be a lithium-ion, lead-acid, or other battery. In some examples, the vehicle may require both a lithium-ion and a lead-acid battery. In such examples, the system and method described herein may identify a preferred battery of each type.

Figure 1:
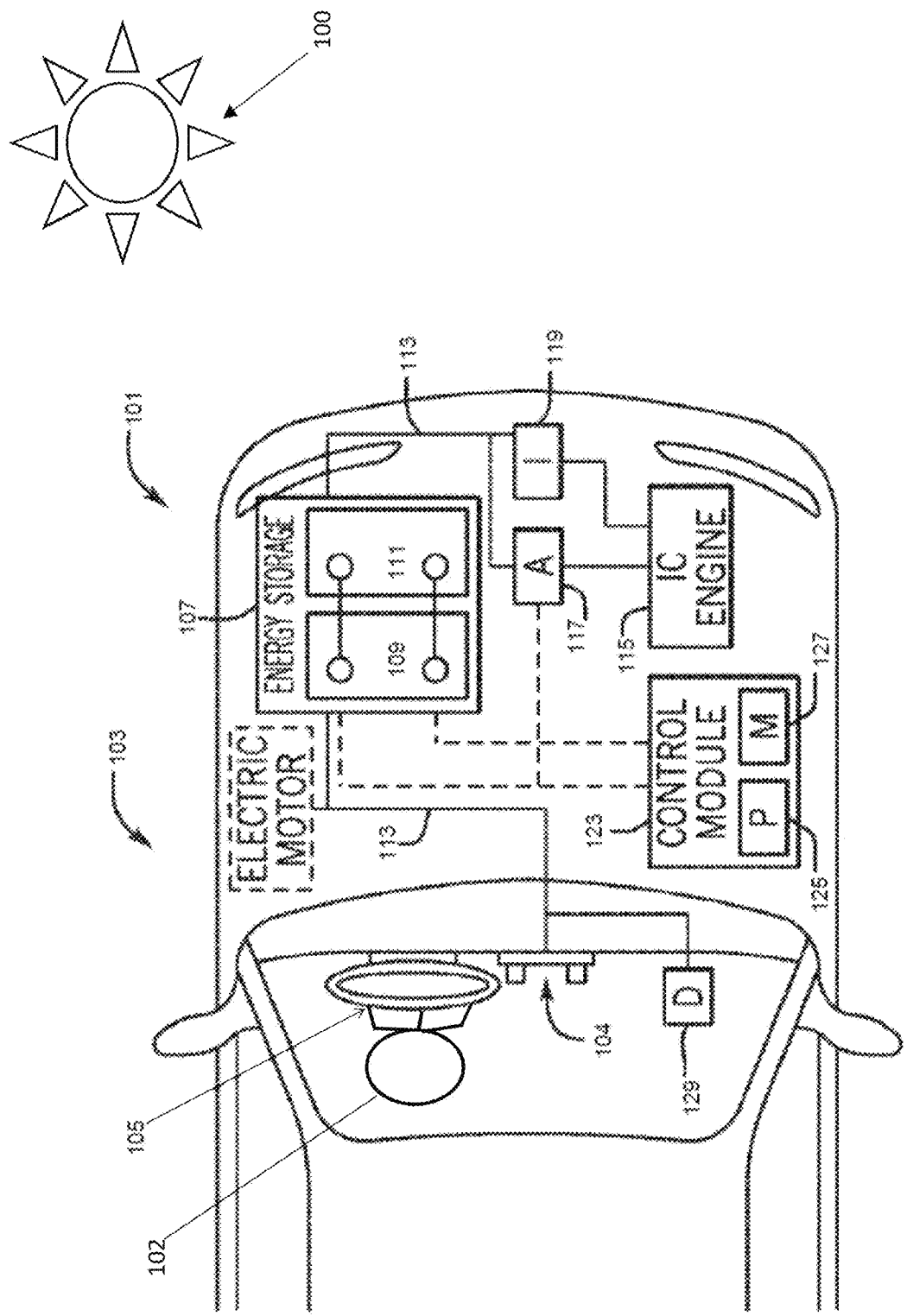
FIG. 1 is a block diagram representing portions of a vehicle.

FIG. 1 depicts a battery system 101 for electrical communication with the vehicle 103 in which the battery system 101 is located. The battery system 101 may include an energy storage component 107, which may comprise one or more batteries or battery modules 109, 111. The vehicle 103 may further comprise an engine 115, alternator 117, ignition system 119, and control module 123 which may have a processor 125 and memory 127. The energy storage component 107 may be electrically coupled to the vehicle's electrical system by way of a bus 113. This may provide power to functional components of the vehicle 103, including electrical devices such as the vehicle display 129 and advanced vehicle functionality 105.

A vehicle electrical system may be included in an automotive vehicle 103 or the like. In some embodiments, the control system 124 may control operation of the battery system 101 and/or the electrical devices 104. For example, in an automotive vehicle 103, the control system 124 may include a battery management system (BMS) and/or a vehicle control unit (VCU).

The vehicle 103 may be understood to be operating within an environment 100. Further, an operator or driver 102 may be understood to operate the vehicle 103. The battery system 101 functionality may be understood to be influenced by vehicle features (including, for example, vehicle functionality 105 (e.g., a steering apparatus)). Further, battery system 101 functionality (such as the support of vehicle requirements) may be influenced by environment 100 and/or driver 102 behaviors or usage patterns.

FIG. 2 shows a number of tables 201 describing a number of different example non-limiting factors, which may influence the life or performance of a battery (e.g., batteries 109 and 111). As shown in FIG. 2, a number of factors can influence power requirements and demands on a battery in a vehicle 103. At an over-arching level, these factors may include high electrical demand (or electrical demands generally) 203, user behavior (i.e., driver factors) 202, and environment 200. Combinations of these factors or scenarios (for example, potential scenarios that lead to more capable technologies) may include a number of states 237. In various embodiments, states 237 may include only environmental factors 200, only user behavior/driver factors 202, combinations of environmental 200 and user behavior (driver) 202 factors, electrical demand 203 only, electrical demand 203 and environmental 200 factors combined, user behavior 202 and electrical demand 203 combined, or combinations of all three (electrical demand 203, user behavior 202, and environment 200).

Moving to the bottom half of FIG. 2, a number of influencing factors 233 and applications 235 are shown for the three factors 203, 202, 200 described above. For example, electrical demand (in various embodiments, high electrical demand) 203 may further comprise a number of influencing factors 233, such as functionalities built into the vehicle itself at production (OE on board), any automotive enhancements (AM enhancement), or other load management strategy situation. These features may find application 235 or may be relevant to particular vehicles, such as diesel vehicles, plow trucks, minivans, luxury vehicles, and/or start/stop equipped vehicles.

Also as shown in FIG. 2, user behavior (driver factors) 202 may also impact demands on a battery (e.g., batteries 109 and 111). This may include influencing factors 233 such as driving patterns, any devices the user has plugged into the vehicle (plug ins), and whether the user is driving the vehicle in an urban, suburban, and/or rural setting (driver context). The application 235 or circumstances (for example but not limited to the application of the influencing factors) under which a driver would use the vehicle may be to get groceries (milk run), frequently drive long distances (road warrior), to school (student), as an avid vehicle enthusiast, or in traffic (commuter).

In addition, FIG. 2 also details environmental factors 200 ("environment the vehicle operates within") which may impact vehicle electrical loads and in turn battery performance over time. These factors 233 may include, but not be limited to, temperature (both ambient temperature and temperature under the vehicle hood), road condition, and battery placement in the vehicle. In addition, this may include pressure, desert environment, southern environment, and whether a heat shield is present.

Various impacts on electrical loads and battery usage such as, but not limited to, those outlined above may impact battery longevity. Analyzing and/or monitoring these and other features, over time, may assist in understanding battery longevity under these and other conditions.

Figure 3:
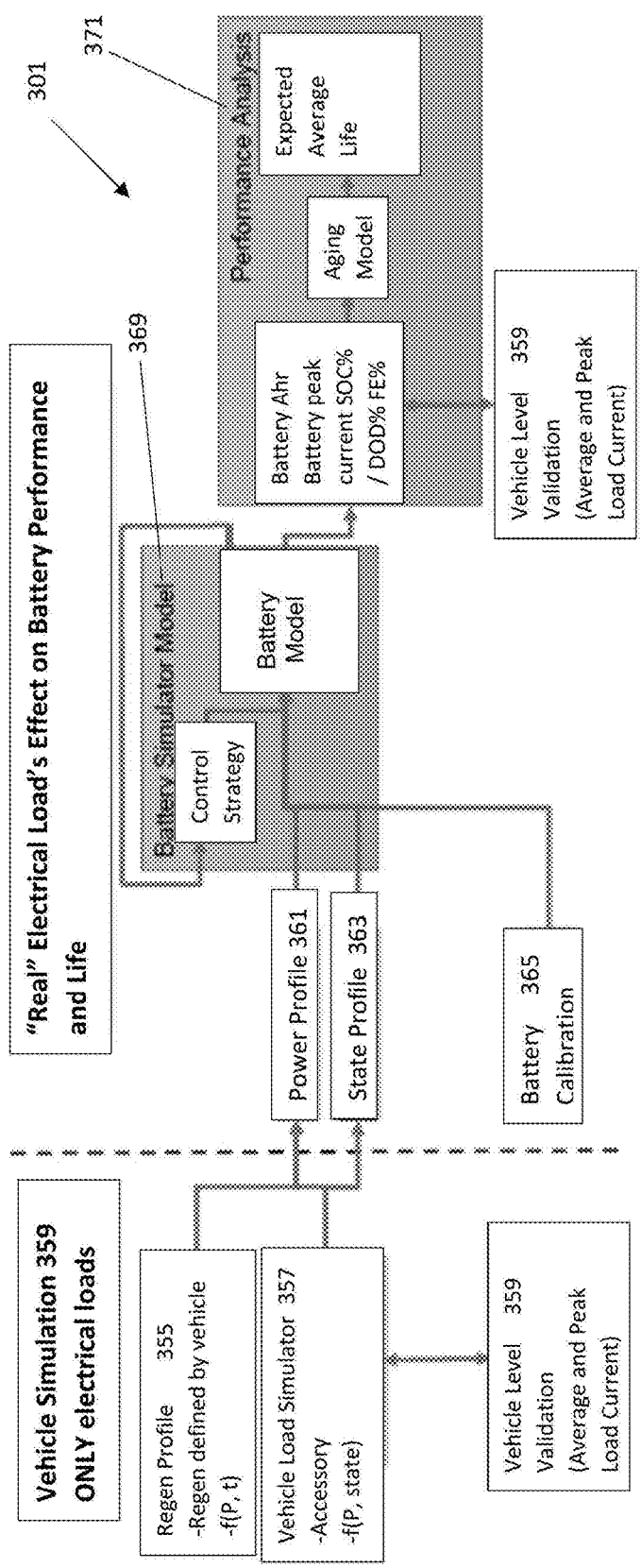
FIG. 3 is a block diagram of a system for and method of determining electrical load impact on battery performance.
Figure 7:
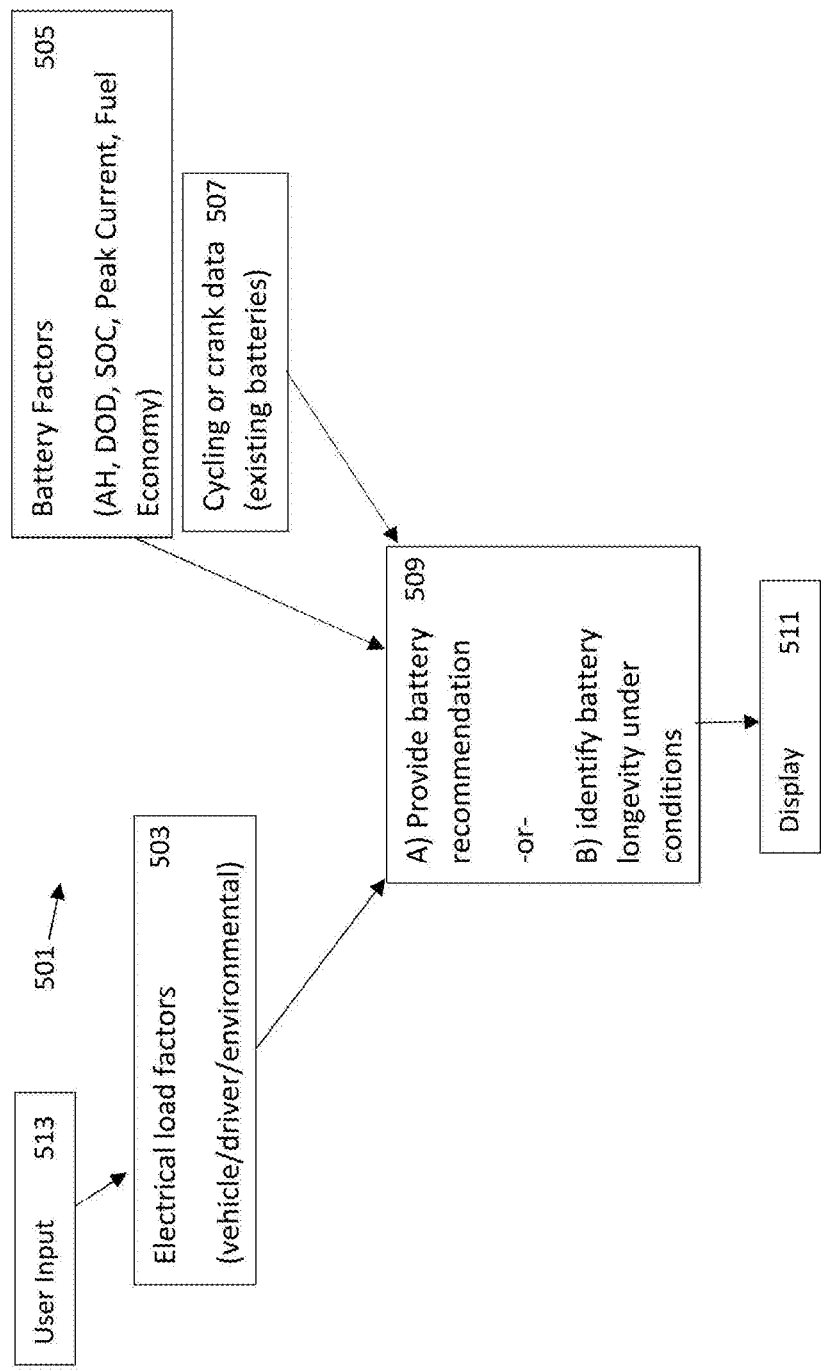
FIG. 7 is a block diagram of a workflow for use with the system and method herein for battery selection relative to vehicle function.

FIG. 3 may be understood to illustrate how a system of modeling impacts battery longevity. In various embodiments, the system may comprise a vehicle simulation component 359 and "Real" Electrical Load component which may further comprise a battery simulator model 369 and performance analysis 371 portions. The system may be understood to comprise factors discussed further herein such as, but not limited to, battery factors, vehicle loads, and/or the plurality of cycling or crank data. Battery factors 505 (for example, as shown in FIG. 7) may comprise amperage hour throughput (Ah), depth of discharge (DOD), state of charge (SOC), peak current and battery contribution to fuel economy.

For example, in FIG. 3 a vehicle simulation 359 may initially be ran in order to gain preliminary insight into per-vehicle preliminary loads. The vehicle simulation 359 may include a regeneration power profile, which may be defined by the vehicle as a function of time. The vehicle simulation 359 may also include a vehicle load simulator 357. The vehicle load simulator 357 may include use of an accessory and/or consideration of vehicle accessories. The vehicle load simulator 357 may consider load as a function of time and vehicle state. The vehicle simulation may further include vehicle level validation 459. The vehicle level simulation 359 may take modify or be modified by the vehicle level validation 459. Vehicle level validation 459 may include average and peak load current.

Next, simulated or actual electrical loads from the vehicle may be used to evaluate effect on battery performance and life. A regeneration profile 355 and/or vehicle load simulator 357 may be seen to feed into a power profile 361 and/or state profile 363 of a vehicle. Further, battery calibration 365 data may be obtained. This data may be seen to feed into a battery simulator model 369. The battery simulator model 369 may be seen to comprise a control strategy and equivalent circuit model. A battery simulator model 369 may be ran and performance analysis 371 may be evaluated. The battery performance analysis 371 may include battery ampere hours, battery peak state of charge, depth of discharge, and fuel economy. These may be compared with vehicle-level validation 359, which may include average and peak battery current. Standard aging for the battery may, likewise, be modeled. Finally, an expected life of a new battery under the conditions may be obtained in various embodiments. In various embodiments, the system and method may evaluate and output cycling life of a battery.

In FIG. 3, the battery simulator 369 and performance analysis 371 relationship can be seen for production of an expected life of a new battery. In various embodiments, the system may predict anticipated cycling life of a battery. Again, this may include incorporation of known battery aging models.

Figure 4:
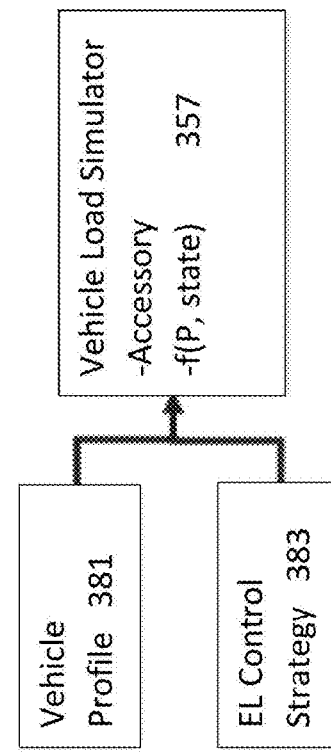
FIG. 4 is block diagram of a vehicle load simulator for use with the system and method herein.

In FIG. 4, more details regarding the vehicle load simulator 357 are provided. In various embodiments, a vehicle profile 381 and electrical load control strategy 383 may be combined to produce a vehicle load simulator 357. FIG. 4 shows some simplified factors which may impact the vehicle load simulator. As shown, the vehicle profile 381 and electrical control strategy 383 may be used in the vehicle load simulator 357.

The system and method may further comprise a system and method for obtaining estimates of vehicle load, which may, in various embodiments, be obtaining readings from an actual vehicle. Here again a number of scenarios may be present (vehicle type, season, time). Initial data and/or vehicle profiles may then be used. Next, the system may allow for selection of a number of drive simulations. The simulated loads may be based on known vehicle loads (see, e.g., FIG. 5).

Figures 5, 6:
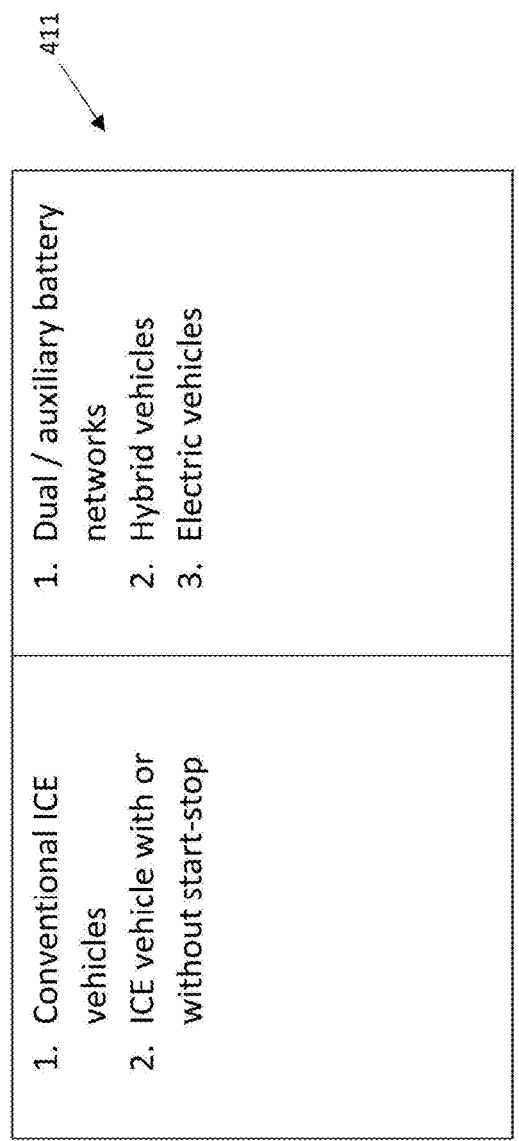
FIG. 5 is a tabular diagram of a number of examples of electrical loads which may impact battery longevity.
FIG. 6 is a tabular diagram of a number of vehicle types for use with the system and method herein.

FIG. 5 shows a variety of electrical loads, including those associated with advanced battery functionality, may impact battery functionality and longevity within a vehicle. The electrical load may be understood as devices 401. Depending on the vehicle (vehicle profiles 403 which may likewise correlate to vehicle profiles 381), these electrical loads (for example, device(s) 401) may not be part of the vehicle function. For example, autopilot may not be part of vehicle 1 and vehicle 2, but may be part of vehicle 3. Load (Device 401) presence may also be dependent on season and/or time (for example, season and time profiles 405). For example, energy load management may be present in vehicle 2 during all seasons, whereas biometrics may be present in vehicle 1 or vehicle 2 in night, summer, or winter but not the day.

A number of different vehicle types 411 are shown in FIG. 6. Each vehicle type may be usable (or optimally usable) with a particular type of battery under differing conditions. For example, conventional internal combustion engines (ICE) vehicles have different electrical requirements than, for example, ICE vehicles with start-stop functionality, vehicles with dual/auxiliary battery networks, hybrid vehicles. Some vehicles may have multiple batteries, for example, and start-stop only vehicles may have two batteries. Therefore, vehicle profile and/or electrical load control strategy (for example, 381, 383) may change based on the vehicle type 411.

FIG. 7 shows a summary or workflow of an example system and method herein 501, according to various examples of embodiments. A general repository of electrical load factors 503 may be consulted and an identification of particular needs based on factors such as vehicle, user characteristics or driver factors, and environment (i.e., environmental factors) may be made. In addition, information about battery types and functionality (e.g., battery factors 505) and cycling and/or crank data 507, particularly for existing batteries, may likewise be provided. In various embodiments, cranking may be considered a load. Then, based on these inputs, in various embodiments, the system may provide an output 509 such as a recommended battery or may provide feedback to a user regarding battery longevity under those particular conditions.

In various embodiments, the system and method herein may comprise one or more algorithms (for example, as shown in the Figures) comprising one or more software components and one or more computers. For example, the output 509 may be provided on a screen or interface while battery factors 505, cycling and/or crank data 507, and electrical load factors 503 may be provided in one or more databases or distributed systems. Further, information or factors such as, but not limited to, those provided in the Figures may be inputted or otherwise provide into one or more databases for access by the system and method herein. For example, in one or more non-limiting embodiments, simulators and analysis components (such as, but not limited to, the vehicle load simulator 357, the battery simulator 369, performance analysis 371, and/or output 509) may comprise software programs and components such as profiles (for example but not limited to the regeneration profile 355, the power profile 361, the state profile 363, the general repository of electrical load factors 503, the battery factors 505, and/or the cycling and/or crank data 507) may comprise certain data.

The system and method herein may be provided in various settings. For example, the system and method herein may allow for an output 509 or interface at a point of sale or as part of business management or operation tools (such as, but not limited to, in inventory management, inventory planning, etc.). In various embodiments, output 509 may comprise a display 511. In various embodiments, users may provide certain data (e.g., user input 513), for example, as driver information as part of electrical load factors 503 in FIG. 7. This may be understood to comprise, for example, but not limited to, factors such as user behavior (i.e., driver factors) 202, environment factors 200, or electrical demand 203 factors as seen in FIG. 2. This and other information may allow for an output 509 such as a recommended battery. For example, the output 509 may be a screen or display 511 in a variety of contexts. For example, the display 511 could be provided at a point of sale (e.g., for recommending a battery for user purchase, as a non-limiting example), in warehouse (e.g., for inventory management, as a non-limiting example), in a business management context (e.g., inventory planning), or other context (e.g., warranty planning). In various embodiments, the display 511 may include a user interface or further mechanism for accepting user input 513. This may include, for example, a display 511 on a mobile device having a touchscreen for user input 513. While a mobile device may be provided, one or more computers having a suitable input mechanism generally should be contemplated as within the scope of the invention. It should be understood the foregoing are non-limiting examples of contexts and use cases which may advantageously be used with the system and method herein and further advantages and applications may be understood by those in the field. The system and method herein should be understood to provide advantages in a variety of contexts including but not limited to in both aftermarket and OEM settings.

Figure 8:
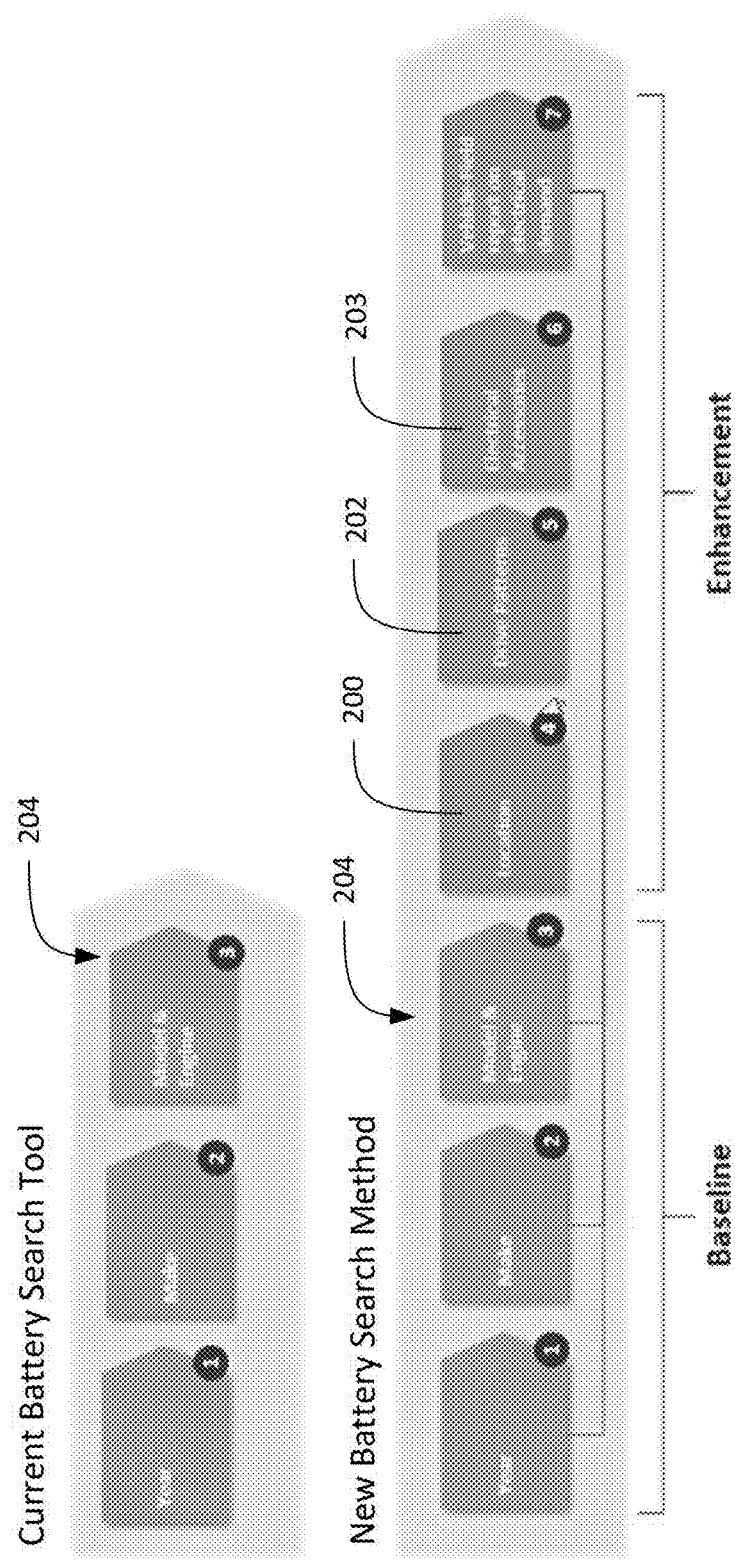
FIG. 8 depicts a comparison between a current battery search too and the system and method herein.

FIG. 8 depicts a comparison between a current battery search too and the system and method described herein for selecting a battery 101. The current battery search tool uses only the vehicle factors 204 (e.g., year, make, model and engine of the vehicle). The current battery search tool then provides multiple battery options that will fit within the battery compartment of the designated vehicle and the CCA of the vehicle.

In contrast, the system and method described herein for selecting a battery 101 accounts for other factors (e.g., driver factors 202, environmental factors 200, electrical demand 203) to provide a recommended battery that will result in the longest life of the battery for the user at the best value. The described system 101 first uses the vehicle factors 204 to eliminate batteries that will not fit in and/or work with the designated vehicle 103. Each additional factor may eliminate additional batteries that will not provide as long of a battery life for the user. For example, the location factor may narrow the field of batteries based on the average temperature of the area (e.g., a cold climate vs. a warm climate) because some batteries may perform better in certain locations (e.g., cold climates) better than other batteries. Eliminating batteries not as well suited for the user's location allows the system to recommend a battery that will last longer for the user, and thus, be a better value. Each of other driver factors 202 and environmental factors 200 may similarly narrow the field of batteries that may be recommended to the user. Additionally, an anticipated demand of the battery is determined (e.g., based on the vehicle factors 204, the environmental factors 200, the driver factors 202, electrical demand 203 etc.). The demand may then be categorized into a low demand, a medium demand, or a high demand. The anticipated demand may factor may further narrow the battery field because the described system 101 for providing a battery recommendation will only recommend a battery that can meet the anticipated demand level. Finally, the described system 101 for recommending a battery selects a battery from the remaining field of batteries that will provide the best value to the user (e.g., maximum battery life and/or reliability for the lowest price).

Figure 9:
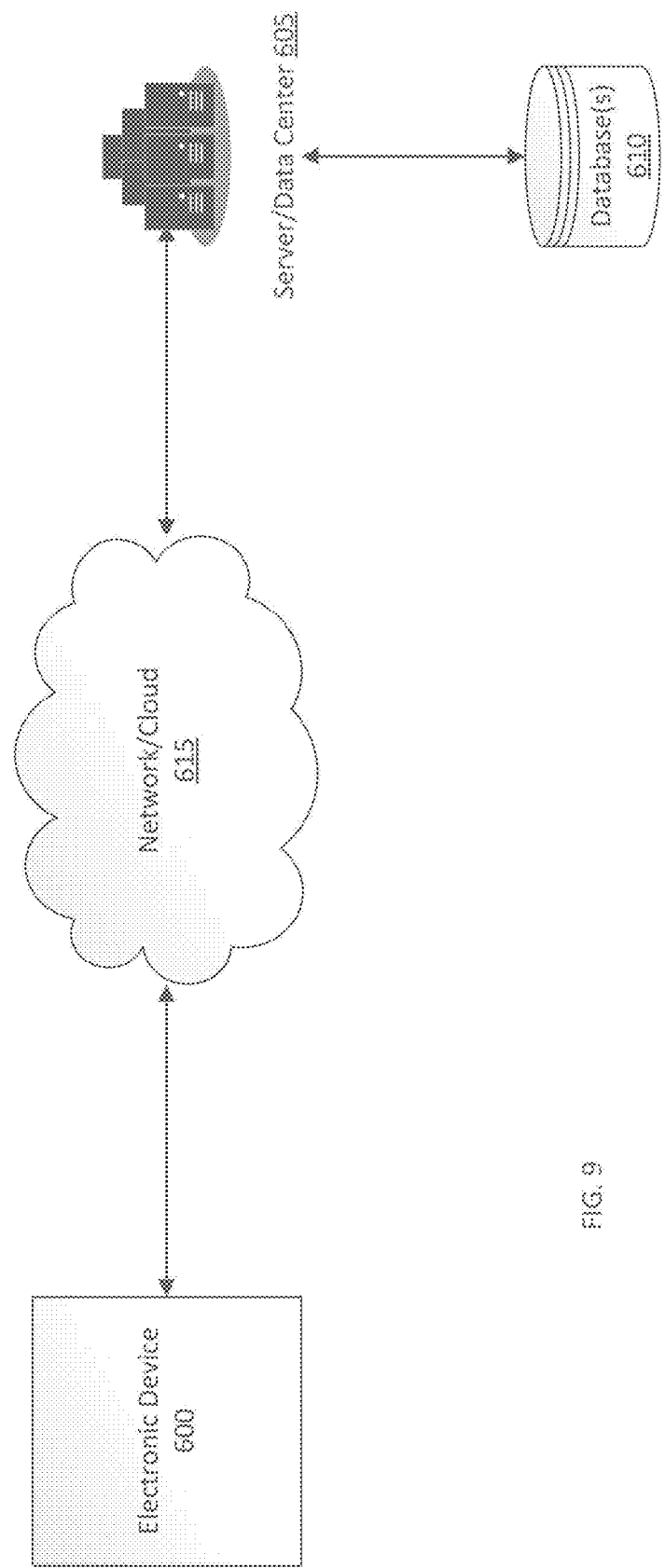
FIG. 9 is a block diagram of a system for selecting a battery relative to user-provided information related to a vehicle.

FIG. 9 provides another example method of and system for selecting a battery relative to user-provided information related to a vehicle. For the implementation shown in FIG. 9, a user (e.g., vehicle owner) interacts with an electronic device 600, and the electronic device 600 communicates with a server/data center 605 having a number of databases 610. The communication is over a number of networks 615.

Figure 10:
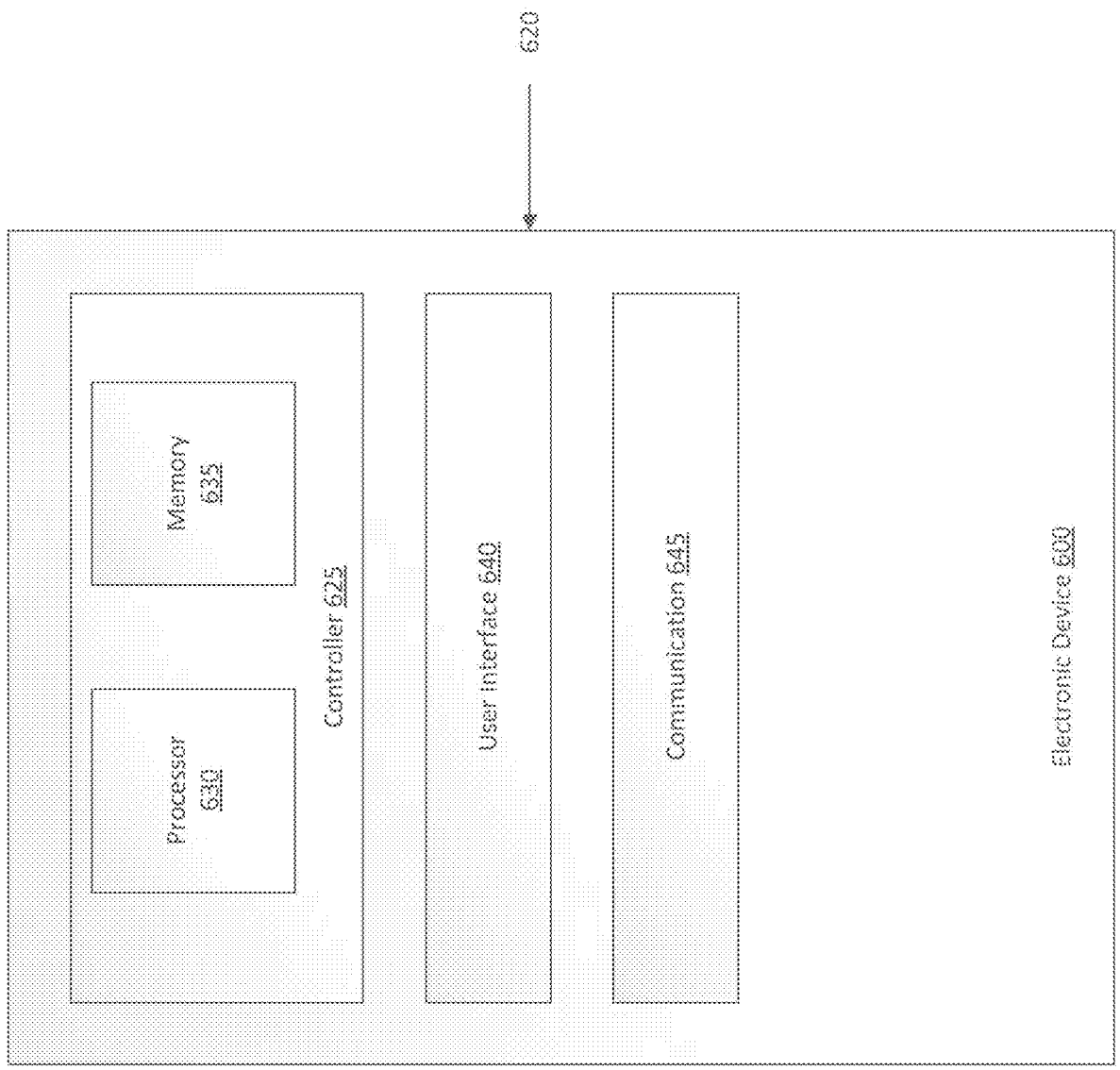
FIG. 10 is a block diagram of an electronic device used in the system of FIG. 9.

A portion of the electronic device 600 is schematically shown in FIG. 10. The electronic device 600 can be a mobile electronic (or computing) device such as a laptop computer, a netbook computer, a notebook computer, a Google Chromebook™ computer, a tablet device (such as an Apple iPad®, Samsung Galaxy®, or Microsoft Surface®, or any similar known or future developed tablet), a mobile smartphone, or any other known or future developed mobile electronic device (e.g., a battery tester). The electronic device 600 can alternatively be a stationary electronic (or computing) device such as a desktop computer, a computer kiosk, or any other known or future developed stationary electronic device. In FIG. 10, the electronic device 600 has a housing 620 for enclosing and protecting the various components illustrated as blocks in FIG. 10. The electronic device 600 has a controller 625, including a processor 630 and a memory 635. While the arrangement of FIG. 10 shows a single controller 625, processor 630, and memory 635, it is envisioned that many other arrangements are possible.

The processor 630 can include a component or group of components that are configured to execute, implement, and/or perform any of the processes or functions described herein for the electronic device 600 or a form of instructions to carry out such processes or cause such processes to be performed. Examples of suitable processors include a microprocessor, a microcontroller, and other circuitry that can execute software. Further examples of suitable processors include, but are not limited to, a core processor, a central processing unit (CPU), a graphical processing unit (GPU), an array processor, a vector processor, a digital signal processor (DSP), a field-programmable gate array (FPGA), a programmable logic array (PLA), an application specific integrated circuit (ASIC), math co-processors, and programmable logic circuitry. The processor 630 can include a hardware circuit (e.g., an integrated circuit) configured to carry out instructions contained in program code. In arrangements in which there are a plurality of processors, such processors can work independently from each other or one or more processors can work in combination with each other.

The electronic device 600 includes a memory 635 for storing one or more types of instructions and/or data. The memory 635 can include volatile and/or non-volatile memory. Examples of suitable memory include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, disks, drives, or any other suitable storage medium, or any combination thereof. The memory 635 can be a component of the processor 630, can be operatively connected to the processor 630 for use thereby, or a combination of both.

In one or more arrangements, the memory 635 can include various instructions stored thereon. For example, the memory 635 can store one or more modules. Modules can be or include computer-readable instructions that, when executed by the processor 630, cause the processor 630 to perform the various functions disclosed for the module. While functions may be described herein for purposes of brevity, it is noted that the functions for the electronic device 600 are performed by the processor 630 using the instructions stored on or included in the various modules. Some modules may be stored remotely and accessible by the processor 630 using, for instance, various communication devices and protocols.

The electronic device 600 includes a user interface 640. The user interface 640 can include an input apparatus and an output apparatus. The input apparatus includes a device, component, system, element, or arrangement or groups thereof that enable information/data to be entered into the electronic device 600 from a user. The output apparatus includes any device, component, or arrangement or groups thereof that enable information/data to be presented to the user. The input apparatus and the output apparatus can be combined as a single apparatus, such as a touch screen commonly used by many electronic devices.

The electronic device 600 includes a communication apparatus 645. The communication apparatus 645 is configured to provide a communication interface between the electronic device 600 and another device, such as the server/data center 605, via the network/cloud 615.

Before proceeding, it should be well understood by somebody skilled in the art that the electronic device 600 includes many additional conventional components typically found in an electronic device 600. Further discussion regarding these components is not provided herein since the components are conventional and their operation are conventional.

The electronic device 600 executes an application (or app), which is stored in memory 635. An application or app includes, but is not limited to, a software application. Generally, apps are available through app stores such as Apple's iTunes®, Google's Play Store®, Microsoft's App Store™, Blackberry®, and so forth. Apps are usually run on operating systems running on iPhones®, iPads®, Android® Phones, Android® Tablets, Apple TV®, Google TV®, and many other similar devices, but can also be run on other operating systems, such as an operating system for a desktop computer. The app can be a gateway app, such as a web-based browser, that interacts with the server/data center 605, such as through a website. The descriptions of the operations relate to their functionality are in terms of the app. This is intended to mean that the app is stored in the memory 635 and includes processor-executable instructions that, when executed on the processor 630, cause the processor 630 to perform the functionality described (in combination with other portions of the memory 635, as well as various hardware components of the electronic device 600 (such as the user interface 640 or the communication component 645, for example) and in communication with the server/data center 605 and database(s) 610).

The electronic device 600 communicates with the server/data center 605 via the network/cloud 615, which can include a number of local area networks (LANs) and/or a number of wide area networks (WANs).

Figure 11:
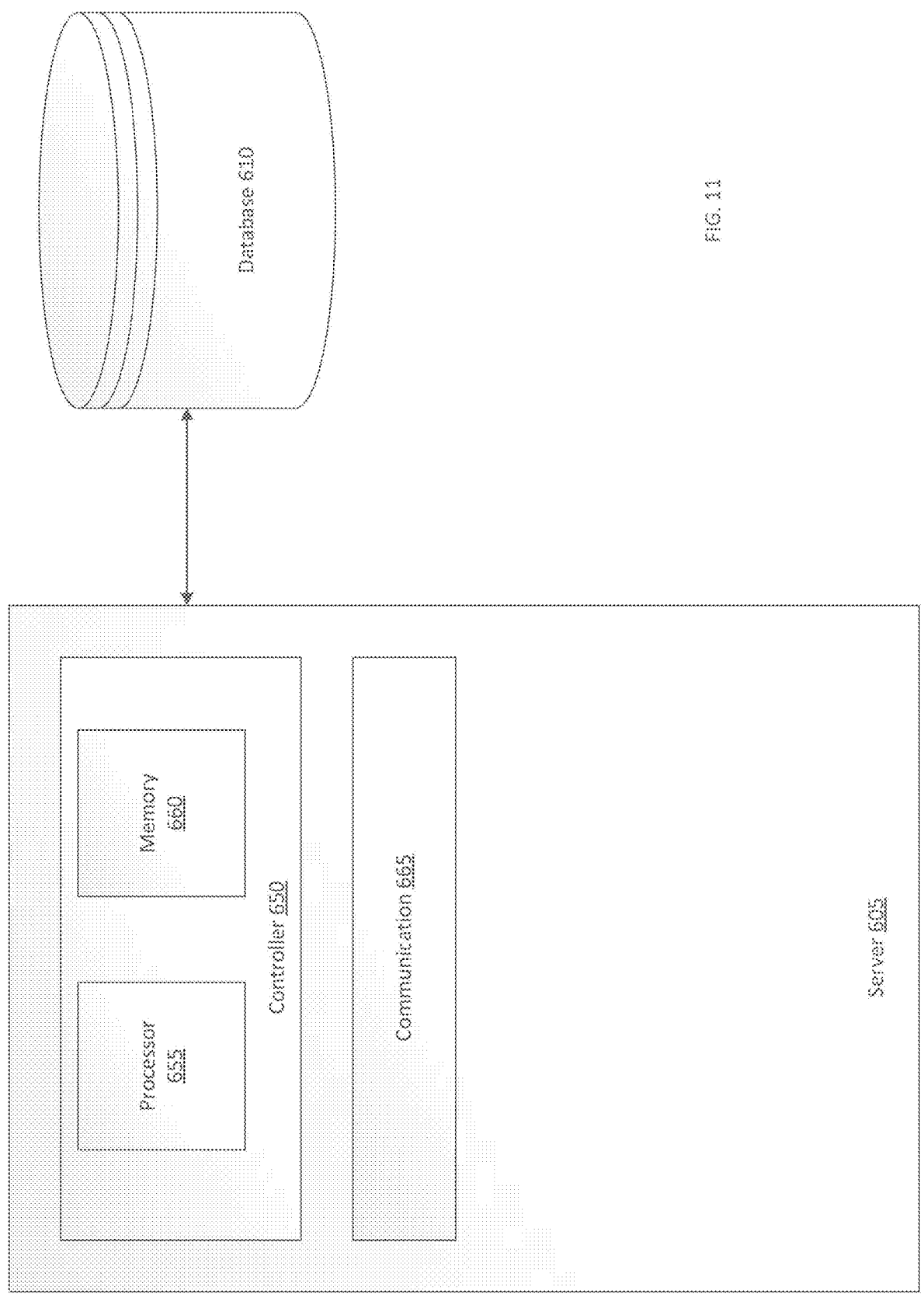
FIG. 11 is a block diagram of a server and database used in the system of FIG. 9.

Referring now to FIG. 11, the figure schematically represents a portion of the server/data center 605 and the database 610. In the illustration of FIG. 11, the server 605 has a controller 650, including a processor 655 and a memory 660, and a communication module 665 for communicating with the other devices of the system (e.g., the database 610 or the network/cloud 615).

The processor 655 can include a component or group of components that are configured to execute, implement, and/or perform any of the processes or functions described herein for the server 605, including the database 610, or a form of instructions to carry out such processes or cause such processes to be performed. Examples of suitable processors are discussed above in connection with the electronic device 600. The memory can include volatile and/or non-volatile memory. Examples of suitable memories are also discussed above in connection with the electronic device 600. The memory can be a component of the processor, can be operatively connected to the processor for use thereby, or a combination of both. The memory 660 includes modules having computer-readable instructions that, when executed by the processor 655, cause the processor to perform the various functions disclosed for the module. While functions may be described herein for purposes of brevity, it is noted that the functions for the server 605 and database 610 are performed by the logic/memory components using the instructions stored on or included in the various modules.

With continued reference to the FIG. 11, the database 610 is, in one implementation, an electronic data structure stored in the memory or another data store and that is configured with routines that can be executed by a processor for recording (or storing) data, analyzing stored data, providing stored data, organizing stored data, and so on. Thus, in one embodiment, the database 610 stores data used by the server 605, and more broadly the system, in executing various functions.

Figure 12:
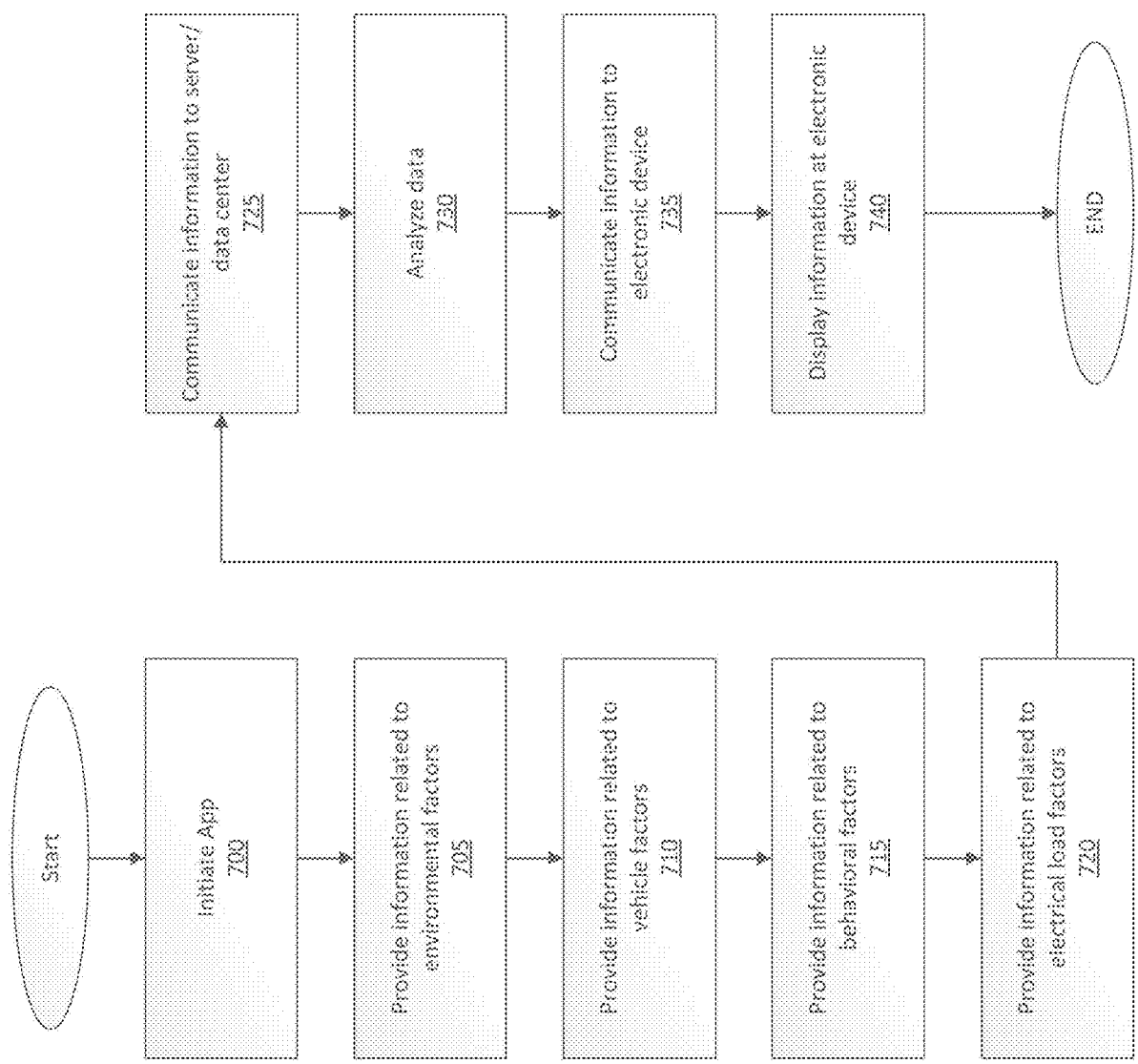
FIG. 12 is a flow diagram of a process for selecting a battery used with the system of FIG. 9.
Figure 13:
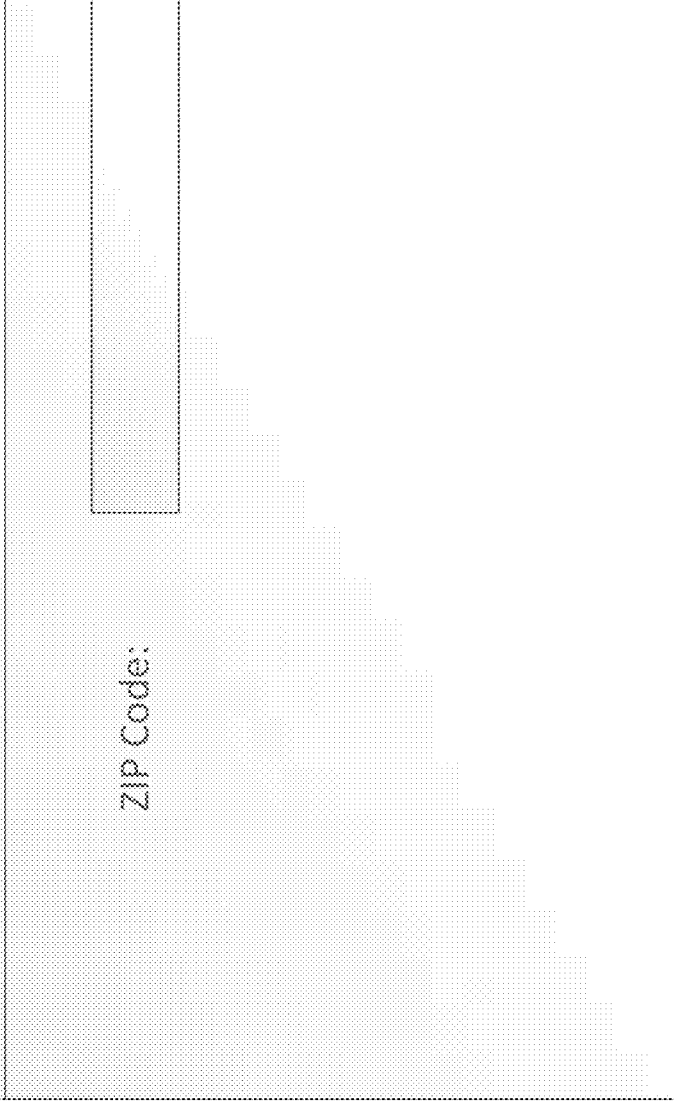
Figure 15:
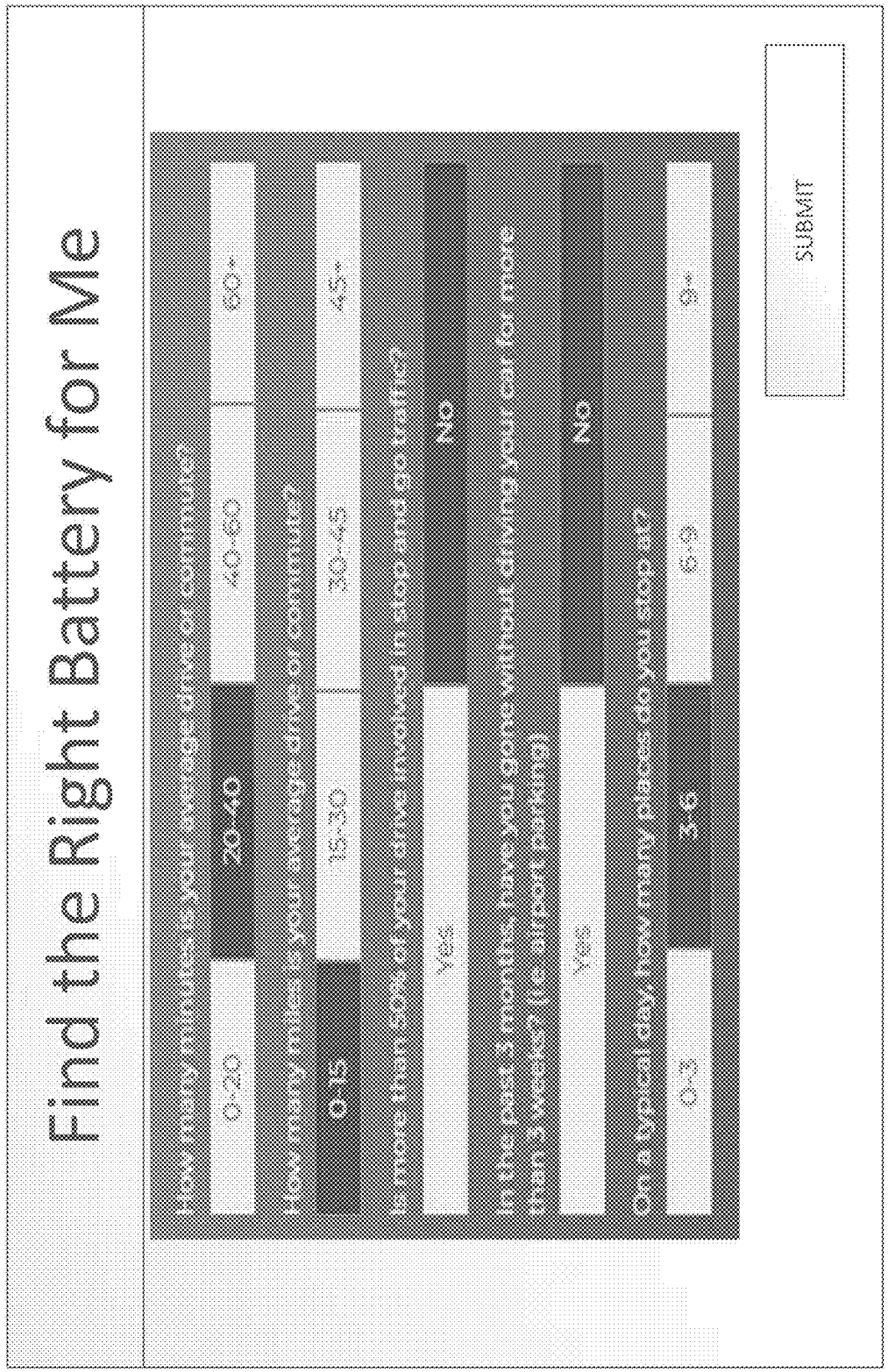
Figure 16:
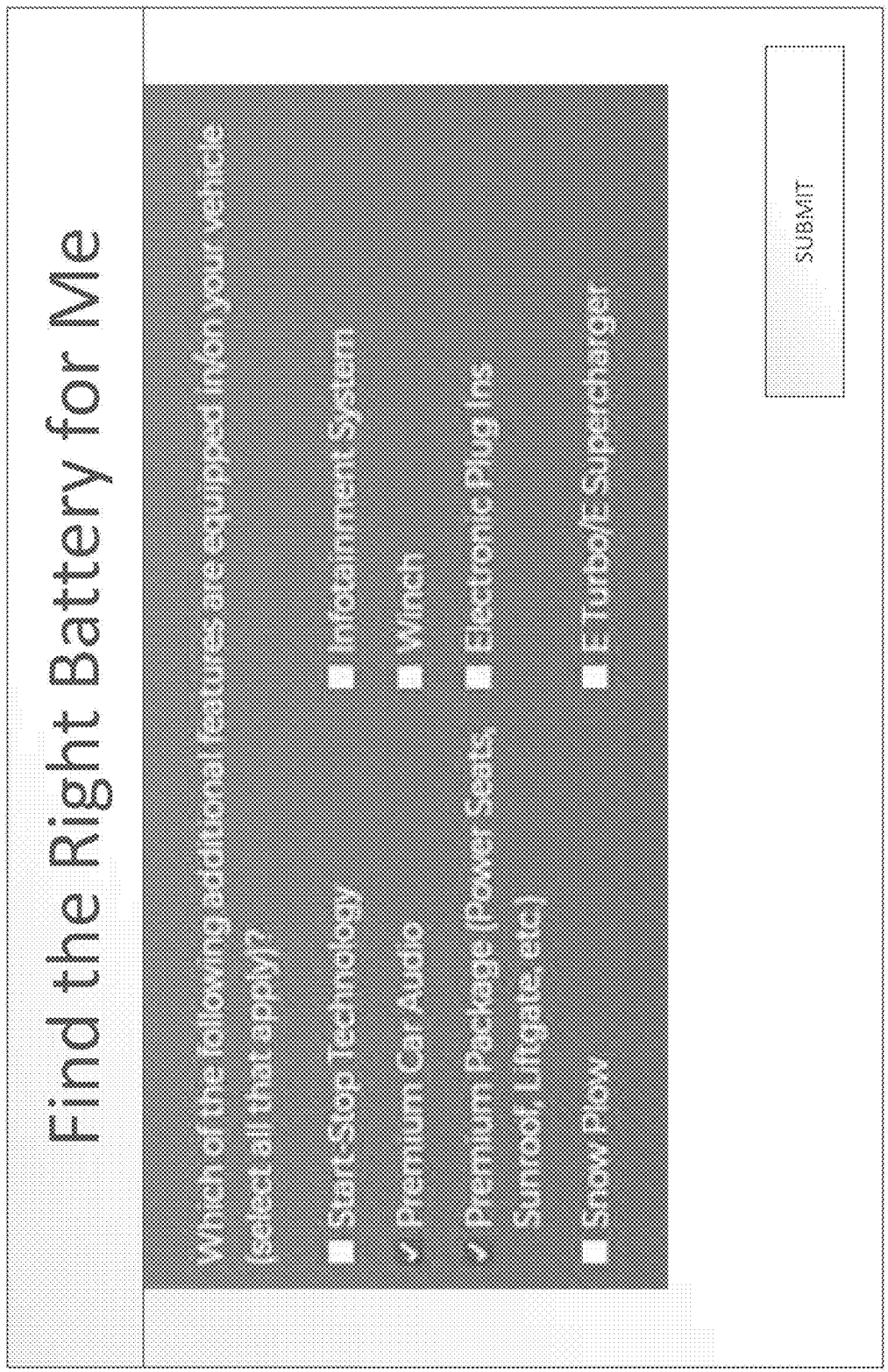

FIGS. 13-18 show a plurality of partial screen shots of a display while performing the app on the electronic device 600 for use with the system of FIG. 9. FIG. 12 shows a workflow for use with the system of FIG. 9. For the methodologies directly or indirectly set forth herein described with FIGS. 12-18, the various steps and operations are described in one possible order of operation; but those skilled in the art will recognize that steps and operations may be rearranged, replaced, or eliminated without necessarily departing from the spirit and scope of the invention. Also, various steps and operations described with FIGS. 12-18 can be performed concurrently.

Starting with block 700 of FIG. 12, a user (e.g., a vehicle owner) starts an app, which can be a web browser for viewing a web site maintained by the server/data center 605. The app causes a display of the electronic device 600 to display a plurality of queries requesting information (or data), as shown in display screen shots in FIGS. 13-16.

At blocks 705-720, the user enters information into the app via a user input of the electronic device 600. For block 705, the entered information relates to potential environmental factors affecting the of operation of the vehicle 103. The environmental factors help indicate how the vehicle's expected environment may impact vehicle electrical loads, and in turn, battery performance over time. Alternatively or additionally, the environmental factors help indicate how the vehicle's expected environment may impact the battery's environment (e.g., due to the location of the battery in the vehicle: in engine, in trunk, near exterior, etc.), and in turn, battery performance over time. For the example shown in FIG. 13, the user enters a postal zip code indicating the location in which the vehicle will predominantly be operated. The server/data center 605 can use the zip code to identify weather, altitude, temperature (e.g., ambient and temperature under the vehicle hood), road conditions, and other environmental data associated with the zip code. Other ways for identifying environmental factors can include entering an address, a municipality, state, discrete environmental factors (e.g., desert environment, northern environment, etc.), global positioning system (GPS) data, store identification (ID), store location, etc.

For block 710, the entered information relates to vehicle factors of the vehicle 103. For the example shown in FIG. 14, the user enters a model year for the vehicle, a make (or manufacturer) for the vehicle 103, and engine information for the vehicle. The vehicle factors help indicated the original equipment (OE) group size, CAA, start-stop applications, PHEV/hybrid/EV vehicles (e.g., powertrain) and electrical load demand, location of the battery in the vehicle, etc. Other types of vehicle factors can include fuel type (e.g., diesel, gasoline), engine size, vehicle classification (e.g., truck, minivan, sports car), etc. Additionally, in some examples, information related to the current battery may be provided. Example information related to the current battery may include battery type, age of the battery, and reason for replacement (e.g., failure, preventative, etc.)

At block 715, the entered information relates to behavioral factors (or expected usage patterns) for the operation of vehicle 103. For the example shown in FIG. 15, the user enters information related to average commute distance, average commute time, type of drive, whether extend time may occur between use, and number of cold starts. The behavioral factors help indicate use behavior by the primary driver(s) for the vehicle. Other types of behavioral factors can include average speed the consumer drives, type of roads on which the vehicle will be driven, etc.

At block 720, the entered information relates to electrical load factors for vehicle 103. Some of the electrical load factors can be determined from the entered vehicle factors (e.g., manufacturer and model of the vehicle 103). The additional electrical load factors entered during block 720 are accessories (or add-ons) not typically associated with the entered vehicle factors, which can affect battery performance. For the example shown in FIG. 16, the user can select whether the vehicle includes certain technologies. Other types of electrical load factors include auto-park, autopilot, biometrics, navigation and GPS.

At block 725, the app causes electrical device 600 to communicate the entered information (or portions of the entered information) to the server/data center 605. The server 605, with use of the database 610, analyzes the information and related data (block 730) and select a battery for the vehicle 103. The selection of the battery may be performed as discussed previously.

Figure 17:
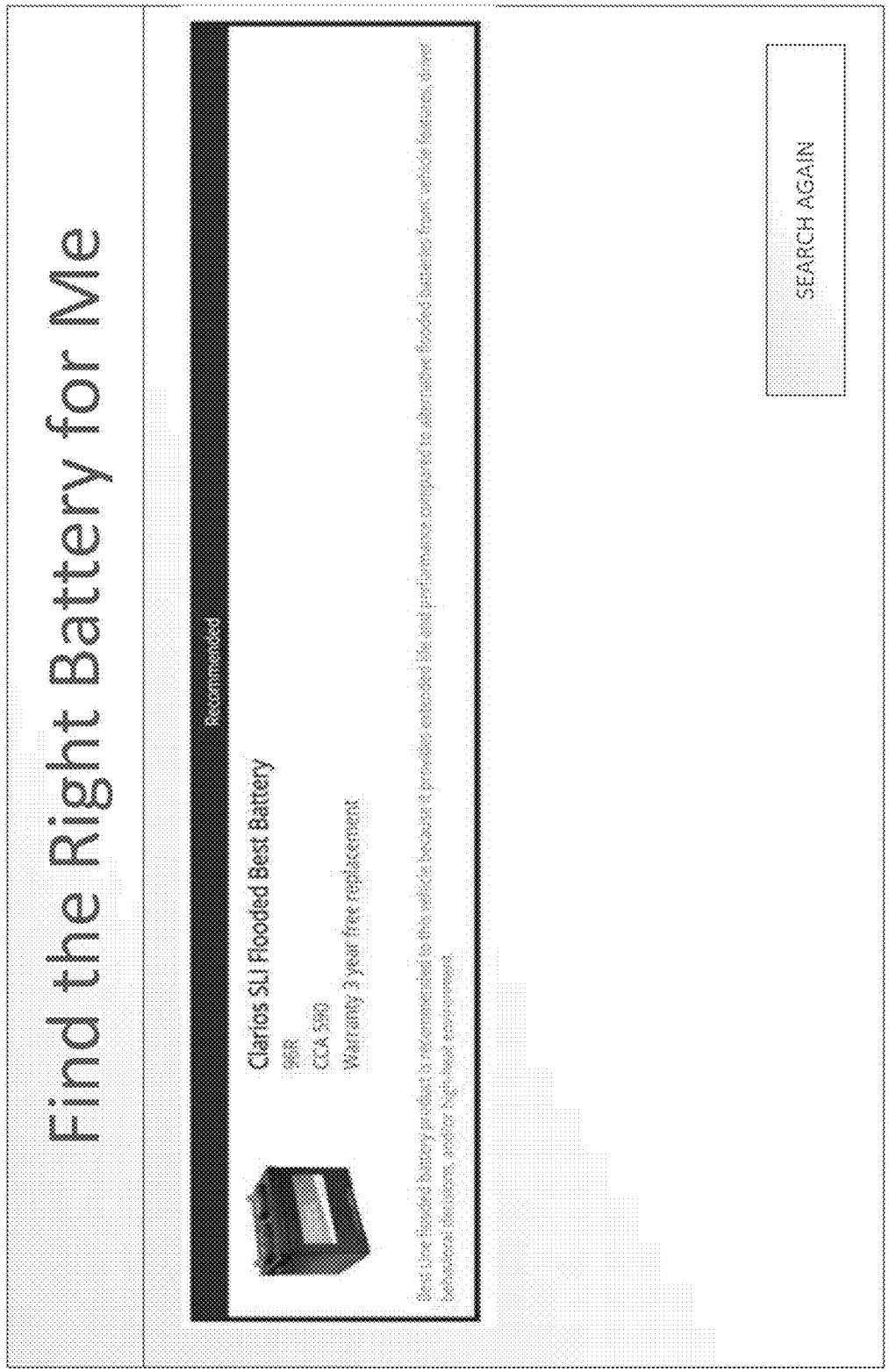
Figure 18:
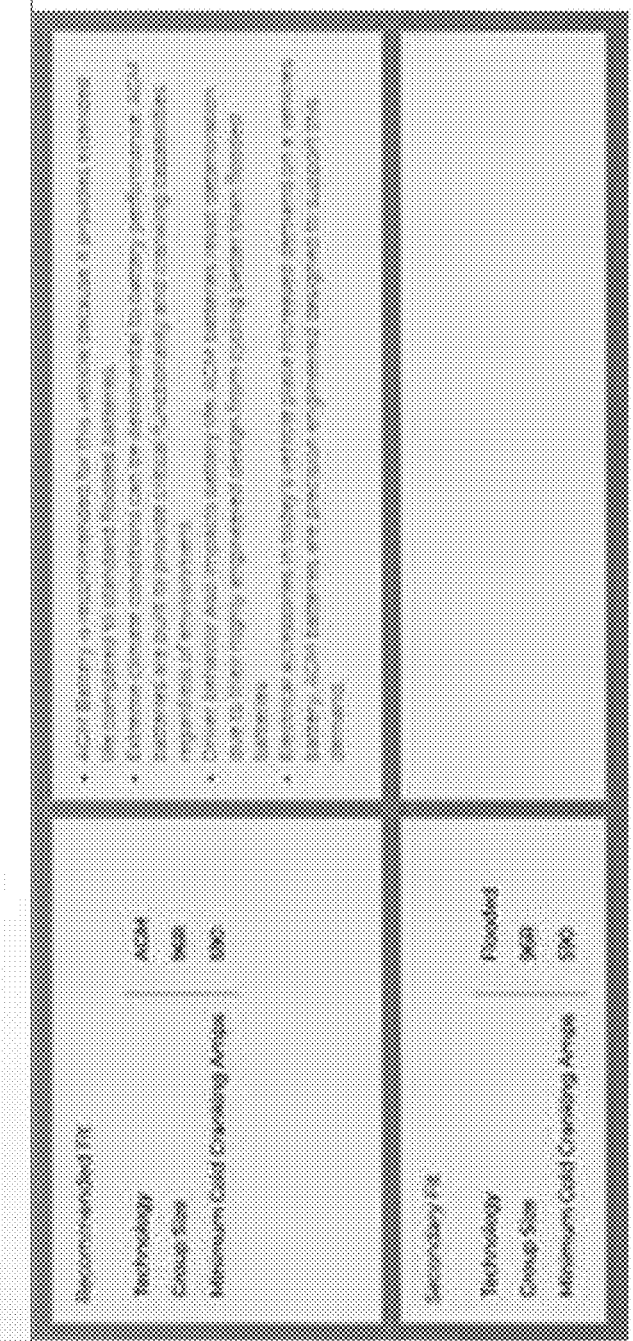

At block 735, the server/data center 605 communicates the battery selection to the electronic device 600, which causes the app of the electronic device to display the resultant selection (block 740). An example selection is shown in FIG. 17. An alternative screen shot is shown in FIG. 18. For FIG. 18, the app provides a recommended fit, a secondary fit, and one or more reasons for the recommended fit and/or a secondary fit.

Before proceeding further, it should be understood that the example described in FIGS. 9-18 is a digital tool which can be integrated as a website, an app, a customer electronic part catalogue, etc. The tool can also be linked to a battery tester or other hardware device like a tablet, smart phone or a computer. The tool can also be hosted in a website through iframe and/or through an API approach.

Figure 19:
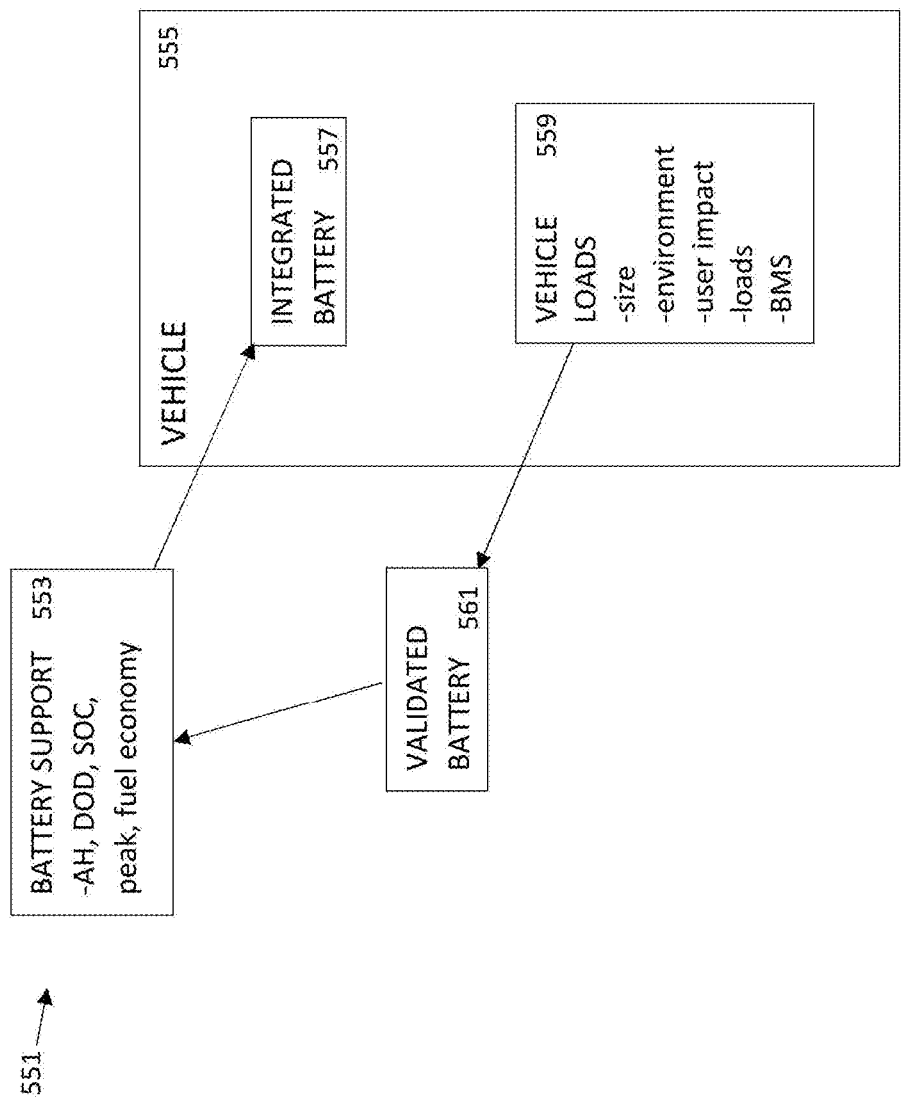
FIG. 19 is a block diagram of a workflow for use with the system and method herein.

FIG. 19 shows another system 551 for use with the system and method herein, according to various examples of embodiments. A vehicle 555 having a vehicle system including the system and method herein according to various examples of embodiments may be seen. The vehicle 555 may have a number of vehicle loads 559. The vehicle loads 559 may comprise consideration of environmental factors (for example, temperature and humidity may impact battery functionality) as well as consideration of user factors (routine highway driving, etc.). Further, the vehicle loads 559 may also comprise size, user impact, loads, and battery management system. A load profile may be understood to comprise the vehicle loads 559. Next, the load profile (vehicle loads 559) may be used to select a group of batteries (validated batteries) 561 which may be known to support the load profile. Next, the system provides for battery support 553 attributes. These attributes may include particular vehicle load support advantages including Amp-hr throughput over time, average and peak current over time, and SOC (state of charge), and DOD (depth of discharge) curves over time. Fuel economy may likewise be considered. A battery from the validated battery group may be selected for integration into the vehicle (which may be understood as a battery selected for its ability to support the identified loads) as an integrated battery 557 based on battery support attributes, in various embodiments. For example, some electrical loads would better fit an AGM battery versus an EFB battery. Certain batteries will have performance characteristics (for example Amp-hr throughput over time, average and peak current over time, and SOC (state of charge)/DOD (depth of discharge) curves over time) than others. Therefore, the integrated battery 557 may comprise a fit between the battery functionality (Battery Support) and vehicle/scenario requirements (vehicle loads or load profile). In various embodiments, the integrated battery 557 may allow for improved support of cranking or cycling than another battery. Further, in various embodiments, the integrated battery 557 may allow for a smaller battery use with the vehicle. By decreasing battery size, vehicle weight and performance may be improved.

Further, the system and method herein may allow for improvements to the battery recommendation or longevity estimate. For example, as further data is collected (for example, but not limited to, electrical load factors or data 203, user behavior factors or data 202, and/or environmental factors or data 200, etc.) the results may lead to updates and improved predictions through their use in the system and method herein. In addition, the system and method herein may update the battery recommendation based on updates to battery technology or the field of known batteries.

In various embodiments, the selection criteria to provide a battery recommendation may be generated from one or more quantitative outputs from one or more models as shown in the Figures. The model outputs may include, but are not limited to, Amp-hr throughput over time, average and peak current over time, and SOC (state of charge)/DOD (depth of discharge) curves over time, and fuel economy. This may be correlated, for example, but not limited to, as battery factors 505 and/or battery support 553.

Multiple objectives may be achieved with the outputs and/or system and method herein:
(1) Performance pairing of one or more batteries, for example, but not limited to, based off of A-hr Throughput, Average and Peak Power/Current, and the SOC (State of Charge)/DOD (Depth of Discharge), of the battery, for example, all over time
(2) Warranty & Expected Remaining Life of one or more batteries, for example, but not limited to, based off the DOD (depth of discharge)
(3) A recommended battery pairing may be selected based off these and other outputs compared among various technologies, group sizes, and usage cases.

The system and method herein may advantageously allow for improved fit between battery and battery usage (vehicle, use case—including user behaviors and environment as disclosed herein, etc.). This may provide advantages in both OEM and aftermarket scenarios for selection of a suitable battery.

In various embodiments, the disclosed system and method may provide a battery recommendation based off the intended usage case, electrical loads, as well as environmental factors of the vehicle. This recommendation may therefore advantageously be backed by quantitative data outputted by a model where selection criteria may then be in place to select an optimum battery or identify battery longevity. The system may be used in new vehicles (OEM setting) or in used vehicles (for example, in replacement batteries). In addition, the disclosed system and method may be used in a single vehicle or in a group of vehicles—for example Zip Code ViO (Vehicle in Operation) Analysis (for IAM) or "All SUVs" (for an OE).

The system and method herein may allow for improved predictions of battery longevity for warranty purposes and battery performance characteristics. The system may also allow for comparison of battery performance, for example, among a range of battery technologies, product lines (including for example manufacturers, plants), and group sizes. The system may also be able to provide battery recommendations and battery longevity predictions across different usage cases and control strategy (for example, but not limited to, vehicle management of alternator and battery) cases and their effect on the life of a particular battery (for example, across use cases or driver behavior such as Soccer Mom vs. Traveling Salesman vs. Off-Road Driver).

In other words, the disclosed system and method herein may have a number of outputs. One may recommend a particular battery given the battery characteristics and requirements of the situation (e.g., vehicle, environment, operator, etc.). Another may predict the lifespan of using the recommended battery (for example but not limited to, for warranty purposes). Finally, the system and method herein may be used to predict longevity of an existing battery within the vehicle. These three uses or outputs are non-limiting examples; other uses and outputs may be understood as within the scope of this disclosure.

It should be noted that references to relative positions (e.g., "top" and "bottom" or "first" and "second") in this description are merely used to identify various elements as are oriented in the Figures. It should be recognized that the orientation of particular components may vary greatly depending on the application in which they are used.

For the purpose of this disclosure, the term "coupled" means the joining of two members directly or indirectly to one another. Such joining may be stationary in nature or moveable in nature. Such joining may be achieved with the two members, or the two members and any additional intermediate members being integrally formed as a single unitary body with one another or with the two members or the two members and any additional intermediate members being attached to one another. Such joining may be permanent in nature or may be removable or releasable in nature.

It is also important to note that the construction and arrangement of the system, methods, and devices as shown in the various examples of embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements show as multiple parts may be integrally formed, the operation of the interfaces may be reversed or otherwise varied, the length or width of the structures and/or members or connector or other elements of the system may be varied, the nature or number of adjustment positions provided between the elements may be varied (e.g. by variations in the number of engagement slots or size of the engagement slots or type of engagement). The order or sequence of any algorithm, process, or method steps may be varied or re-sequenced according to alternative embodiments. Likewise, some algorithm or method steps described may be omitted, and/or other steps added. Other substitutions, modifications, changes and omissions may be made in the design, operating conditions and arrangement of the various examples of embodiments without departing from the spirit or scope of the present inventions.

While this invention has been described in conjunction with the examples of embodiments outlined above, various alternatives, modifications, variations, improvements and/or substantial equivalents, whether known or that are or may be presently foreseen, may become apparent to those having at least ordinary skill in the art. Accordingly, the examples of embodiments of the invention, as set forth above, are intended to be illustrative, not limiting. Various changes may be made without departing from the spirit or scope of the invention. Therefore, the invention is intended to embrace all known or earlier developed alternatives, modifications, variations, improvements and/or substantial equivalents.

The technical effects and technical problems in the specification are exemplary and are not limiting. It should be noted that the embodiments described in the specification may have other technical effects and can solve other technical problems.

Aspects of the method described herein are implemented on a software system running on a computer system. To this end, the methods and system may be implemented in, or in association with, a general-purpose software package or a specific purpose software package. As a specific, non-limiting example, the device could be a battery and/or vehicle in communication with a cloud storage database and/or mobile device. As another specific, non-limiting example, the device could be a mobile device in communication with a cloud storage database.

The software system described herein may include a mixture of different source codes. The system or method herein may be operated by computer-executable instructions, such as but not limited to, program modules, executable on a computer. Examples of program modules include, but are not limited to, routines, programs, objects, components, data structures, and the like which perform particular tasks or implement particular instructions. The software system may also be operable for supporting the transfer of information within a network.

While the descriptions may include specific devices or computers, it should be understood the system and/or method may be implemented by any suitable device (or devices) having suitable computational means. This may include programmable special purpose computers or general-purpose computers that execute the system according to the relevant instructions. The computer system or portable electronic device can be an embedded system, a personal computer, notebook computer, server computer, mainframe, networked computer, workstation, handheld computer, as well as now known or future developed mobile devices, such as for example, a personal digital assistant, cell phone, smartphone, tablet computer, mobile scanning device, and the like. Other computer system configurations are also contemplated for use with the communication system including, but not limited to, multiprocessor systems, microprocessor-based or programmable electronics, network personal computers, minicomputers, smart watches, and the like. Preferably, the computing system chosen includes a processor suitable for efficient operation of one or more of the various systems or functions or attributes of the communication system described.

The system or portions thereof may also be linked to a distributed computing environment, where tasks are performed by remote processing devices that are linked through a communication network(s). To this end, the system may be configured or linked to multiple computers in a network including, but not limited to, a local area network, wide area network, wireless network, and the Internet. Therefore, information, content, and data may be transferred within the network or system by wireless means, by hardwire connection, or combinations thereof. Accordingly, the devices described herein communicate according to now known or future developed pathways including, but not limited to, wired, wireless, and fiber-optic channels.

In one or more examples of embodiments, data may be stored remotely (and retrieved by the application) or may be stored locally on a user's device in a suitable storage medium. Data storage may be in volatile or non-volatile memory. Data may be stored in appropriate computer-readable medium including read-only memory, random-access memory, CD-ROM, CD-R, CD-RW, magnetic tapes, flash drives, as well as other optical data storage devices. Data may be stored and transmitted by and within the system in any suitable form. Any source code or other language suitable for accomplishing the desired functions described herein may be acceptable for use.

Furthermore, the computer or computers or portable electronic devices may be operatively or functionally connected to one or more mass storage devices, such as but not limited to, a hosted database or cloud-based storage.

The system may also include computer-readable media which may include any computer-readable media or medium that may be used to carry or store desired program code that may be accessed by a computer. The invention can also be embodied as computer-readable code on a computer-readable medium. To this end, the computer-readable medium may be any data storage device that can store data. The computer-readable medium can also be distributed over a network-coupled computer system so that the computer-readable code is stored and executed in a distributed fashion.

What is claimed is:

1. A method of selecting a battery for a vehicle, the method being performed by a server in communication with an electronic device executing an application, the method comprising:
   receiving information from the electronic device, the information comprising:
      a vehicle factor associated with the vehicle; and
      an environmental factor associated with the vehicle, a behavioral factor expected for the vehicle, and an electrical load factor associated with the vehicle;
   obtaining data associated with the vehicle factor;
   obtaining data associated with the environmental factor, obtain data associated with the behavioral factor, and obtain data associated with the electrical load factor;
   providing a plurality of battery groups comprising a lithium-ion battery group and a lead-acid battery group;
   analyzing the various data to create a performance pairing of one or more batteries for the vehicle based at least in part on two or more of amp-hour throughput over time, average and peak current over time, state of charge curve over time, depth of discharge curve over time, and fuel economy;
   selecting a battery for the vehicle based on the performance pairing of one or more batteries, the selected battery includes at least one battery selected from the plurality of battery groups; and
   communicating the selected battery to the electronic device.

2. The method of claim 1, and further comprising:
   receiving information from the electronic device about a battery being replaced;
   obtaining data associated with the battery being replaced; and
   further analyzing the data associated with the battery being replaced to select the battery for the vehicle.

3. The method of claim 1, further comprising prompting, via the electronic device, a user to provide the information including at least one of the vehicle factor, the environmental factor, the behavioral factor, and the electrical load factor.

4. The method of claim 1, wherein the vehicle factor includes at least one of a make, model, and year of the vehicle.

5. The method of claim 1, wherein data associated with the vehicle factor may include powertrain, fuel type, engine size, and vehicle classification.

6. The method of claim 1, wherein the environmental factor includes a location.

7. The method of claim 1, wherein data associated with the environmental factor includes climate and temperature.

8. The method of claim 1, wherein the behavioral factor includes at least one of average time of a commute, average milage of the commute, daily use, time in traffic, and average number of stops.

9. The method of claim 1, wherein the electrical load factor includes at least one of electronic plug-ins and start-stop technology.

10. The method of claim 1, wherein the vehicle factor is first used to eliminate batteries that will not fit in and/or work with the vehicle, wherein at least one of the environmental factor, the behavioral factor, and the electrical load factor may be used to eliminate additional batteries that will not provide as long of a battery life for the vehicle.

11. The method of claim 1, wherein an anticipated demand of the battery is determined based on the vehicle factor, the environmental factor, the behavioral factor, and the electrical load factor, wherein the anticipated demand of the battery is then categorized into a low demand, a medium demand, or a high demand.

12. The method of claim 11, wherein the anticipated demand is used to eliminate batteries that will not meet the anticipated demand.

13. The method of claim 1, wherein the selected battery includes at least one battery selected from the lead-acid battery group and at least one battery selected from the lithium-ion battery group.

14. The method of claim 1, wherein the plurality of battery groups further comprises another type of battery group.

15. The method of claim 14, wherein the selected battery includes at least one battery selected from the lead-acid battery group, at least one battery selected from the lithium-ion battery group, and at least one battery from the another type of battery group.

16. A system for selecting a battery for a vehicle, the system comprising:
   a server performing the method of claim 1; and
   an electronic device in communication with the server.

17. The system of claim 16, wherein the electronic device includes a mobile electronic device.

18. The system of claim 16, wherein the electronic device includes a stationary electronic device.

19. The system of claim 16, wherein the electronic device includes a display to display prompts to a user to provide the information including at least one of the vehicle factor, the environmental factor, the behavioral factor, and the electrical load factor.

20. The system of claim 19, wherein the electronic device communicates the selected battery to the user via the display.

* * * * *